S. HAYES.
MACHINE FOR MOLDING FROM CEMENT AND OTHER PLASTIC MATERIALS.
APPLICATION FILED MAR. 27, 1914.
1,185,399.
Patented May 30, 1916.
2 SHEETS—SHEET 1.
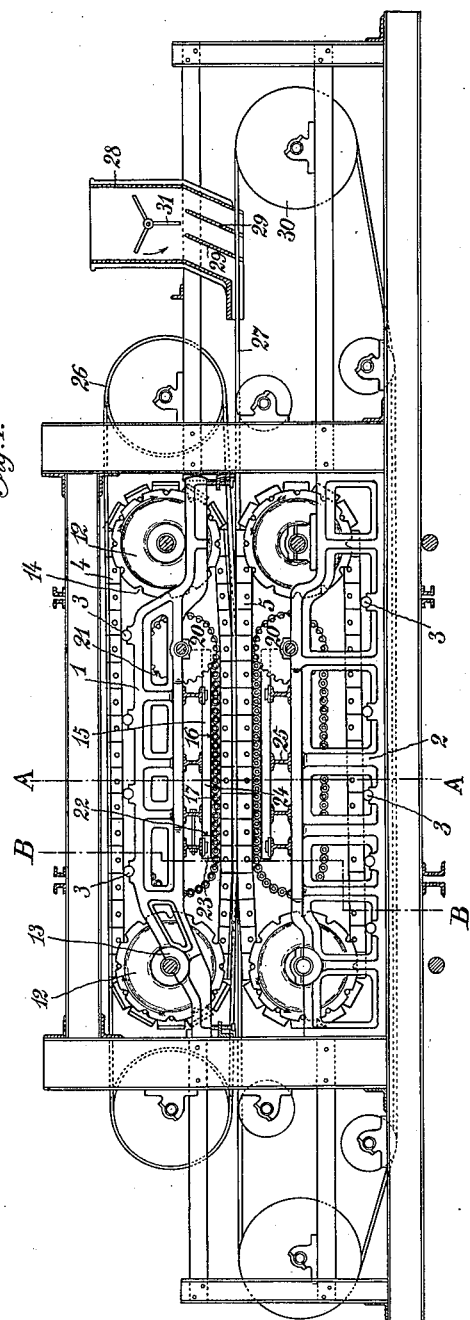
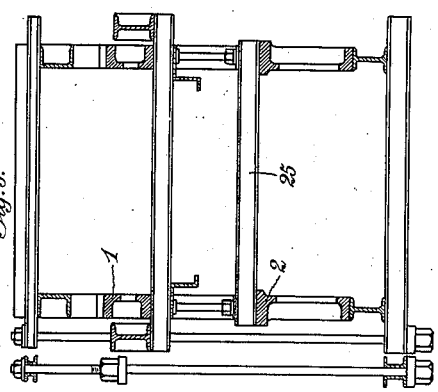
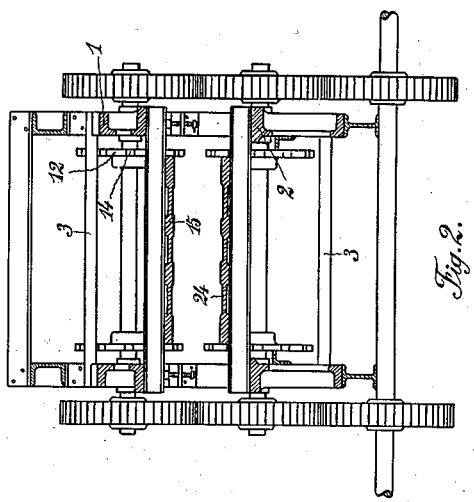
Witnesses
Inventor
S. Hayes
By
Henry T. Bright
Atty S. HAYES.
MACHINE FOR MOLDING FROM CEMENT AND OTHER PLASTIC MATERIALS.
APPLICATION FILED MAR. 27, 1914.
1,185,399.
Patented May 30, 1916.
2 SHEETS—SHEET 2.
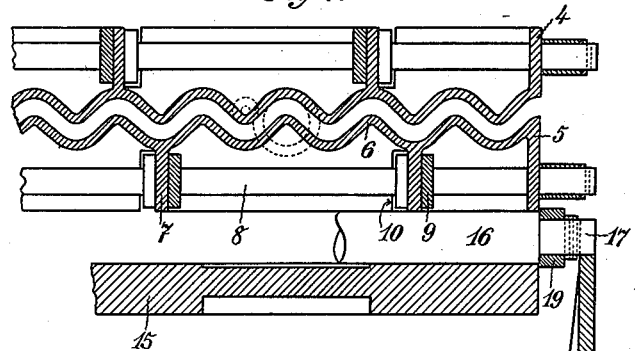
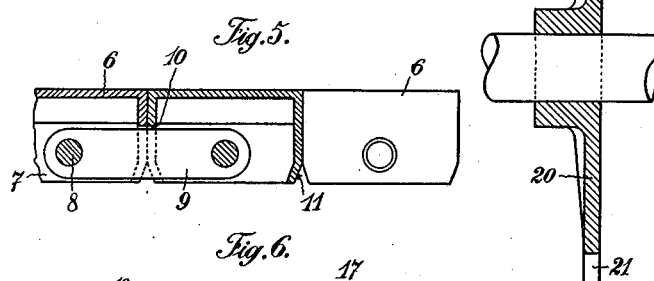
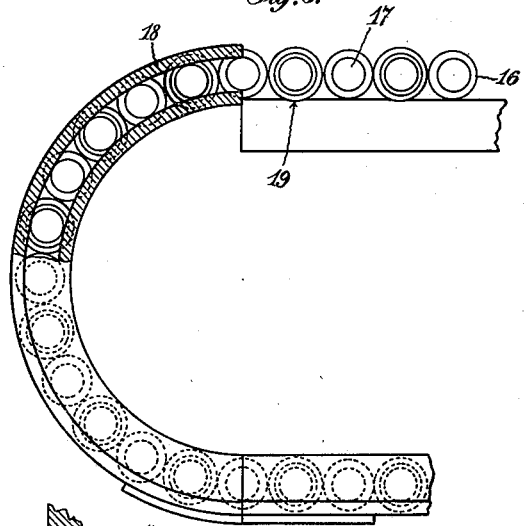

UNITED STATES PATENT OFFICE.

SAMUEL HAYES, OF RICHMOND, ENGLAND.

MACHINE FOR MOLDING FROM CEMENT AND OTHER PLASTIC MATERIALS.

1,185,399.     Specification of Letters Patent.     Patented May 30, 1916.

Application filed March 27, 1914. Serial No. 827,529.

*To all whom it may concern:*

Be it known that I, SAMUEL HAYES, engineer, a subject of the King of Great Britain, residing at 37 Jocelyn road, Richmond, Surrey, England, have invented new and useful improvements in machines for molding from cement and other plastic materials artificial slates, tiles, sheets, slabs, or the like for roofing and other purposes; and I do hereby declare the following to be a full, clear, and exact description of the invention, such as will enable others skilled in the art to which it appertains to make and use the same.

This invention has for its objects and effects to provide certain improvements in machines for molding from cementitious and fibrous materials, artificial slates, tiles, sheets, slabs or the like, for roofing and other purposes, whereby great pressure may be applied to the material during the operation of molding so as to entirely eliminate the necessity for extraneous aid, such as hydraulic presses, in expressing therefrom all superfluous moisture for the purpose of obtaining the desired density and uniformity of the completed products.

A further object is the provision of means whereby the friction dependent upon the movement of certain parts of the machine, subjected to the heavy pressures necessary under the first object, may be reduced to the minimum.

A machine constructed in accordance with my invention consists broadly in the provision of a suitable framework wherein are suspended two cast iron or other members superposed in spaced relation directly one above the other, the upper member being so mounted as to be capable, if desired, of height adjustment with respect to the lower member, which latter rests upon and is firmly secured to the said framework. These members, at each end, support steel or other disks mounted upon suitable axles which run within bearings cast on or bolted to the said members, the peripheries of each disk being shaped so as to engage with, and act as driving mediums for, two endless traveling chains passing thereover, which latter are supported between each driving disk by suitable antifriction devices and are so constructed as to withstand without any extraneous support, great compressive pressures applied at right angles to the plane of their opposing surfaces.

The upper portion of the lower chain passes over a supporting bed which acts as a means for resisting the pressures applied to the lower portion of the upper chain, these pressures being applied, by any suitable means, to the upper surface of a further bed superposed directly above the aforesaid supporting bed, which upper bed is formed in two portions to enable different degrees of pressure being applied to each portion.

The material from a suitable hopper is conveyed into the pressure zone between the opposing surfaces of the two chains, by and between a pair of endless traveling bands made from any absorbent and foraminous material, which belts or bands pass over suitable drums mounted in advance of, and in a plane parallel to, the aforesaid chain driving disks. The drive may be applied through suitable gearing to the disk supporting shafts, the end pairs of which may be coupled in such a manner as to insure their rotation being in opposite directions.

In order that my invention may be fully understood, I will now proceed to describe one suitable method of carrying it into effect by aid of the accompanying drawings in which:—

Figure 1 is a side elevation, with the near side of the framework removed. Fig. 2 is a cross section taken on the line A—A of Fig. 1. Fig. 3 is a similar section taken on the line B—B of Fig. 1. Fig. 4 is an enlarged view in cross section of the two opposing portions of the chains. Fig. 5 is a further section of the chain taken at right angles to Fig. 4. Figs. 6, and 7, are details which will hereafter be more fully referred to.

The machine as shown on the drawings comprises, within a suitable framework, two cast iron members 1 and 2 superposed directly one above the other and provided with a number of fixed rollers 3 which support a pair of endless traveling chains 4 and 5 composed of a number of castings 6, see Figs. 4 and 5, which extend the whole width thereof, and are formed upon their under surfaces with a number of depending lugs 7 bored to receive a steel or other spindle 8, the castings being coupled together by attaching steel or other links 9 to the transversely arranged spindles 8 which links pass through suitable cut away portions 10 formed in the opposing surfaces of each casting, which surfaces are constructed as deep as possible for the purposes in view.

To allow of the chain having a certain amount of flexibility the lower corners are beveled off as at 11. This particular construction of chain has the advantage that it will remain rigid under enormous pressures applied to its outer surface, but will yet be capable of movement in an inward direction. These chains 4 and 5 are passed over steel or other disks 12 mounted in bearings 13 at each end of the cast iron members 1 and 2 these disks being provided around their peripheries with notches or recesses 14 spaced apart a distance equal to that of each of the transverse chain spindles 8, with which they are adapted to engage, so that, when motion is given to the disks 12, they carry the chains around with them.

The necessary pressure is applied by springs or other suitable means, not shown, to a cast iron or other bed 15 which rests upon the upper chain 4 with the interposition of antifriction means, which means are duplicated for the lower chain 5. These antifriction means form an important part of the present invention as without such means it would be impracticable to apply the necessary pressures to the moving belt. The method, as shown, comprises a continuous chain of steel or other rollers 16 provided at each end with reduced portions 17 adapted to run in guides 18 each roller being kept from fouling its neighbor by the provision on each alternate one, of a loose collar 19. Suitable disks 20 are also provided similar in most respects to the aforementioned disks 12, insomuch as their peripheries are formed with a number of equally spaced semi-circular recesses 21 which engage with the reduced portions 17 on each roller 16 thereby keeping them spaced equally apart when ascending and descending during their continuous rotation. It will thus be seen that pressures, up to their crushing point, may be applied to these rollers without any noticeable increase in the resistance offered to their movements being caused thereby. The cast iron or other bed 15 is divided as at 22 into two portions, the forward portion 23 being movable independent of the main portion 15 so that a greatly increased pressure may be applied at that point to consolidate, without distorting, the molded article before it leaves the pressure zone afforded by the bed 15. By this arrangement the incoming material may be partly consolidated and dried before the heavy and final pressure is applied with the consequent prevention of any tendency it would otherwise have to distort.

The pressures downwardly applied to the bed 15 are taken up and resisted by a further bed 24 which rests upon transverse girders 25 supported by the cast iron frame 2, providing a perfectly level and rigid base thus insuring the molded product being of the same thickness throughout. The material to be molded is fed from a suitable hopper on to the lower of a pair of endless traveling felt or other absorbent and foraminous bands 26 and 27 which bands are so positioned with regard to the chains 4 and 5 as to intervene between the material and the said chains so as to absorb all moisture expressed from the material during the molding process, such moisture draining away through suitable perforations, not shown, formed within the castings 6 composing the chains 4 and 5.

The feed hopper employed in the present molding machine is intended to spread the material evenly upon the surface of the lower of the traveling bands 26 with the fibers, if any, all lying in the direction of travel so as to increase the strength of the completed article, and consists, in one suitable form, of a conical or other shaped hopper 28, see Fig. 1, divided, at its lower or discharging end into three or more channels or chutes by division pieces 29, the material within the hopper being agitated by a beater or the like 30, which may be driven, if desired, off the belt drum 31 see Fig. 1, situated directly beneath it, in a direction opposite to that of the belt's motion, the effect being to draw out the fibers, if any as aforementioned, in the material. To prevent the chutes from choking and to insure a regular delivery, the whole hopper is oscillated continuously in a vertical direction, any suitable means being provided for this purpose. The outer surfaces of the castings 6 composing the chains are shaped so as to conform to the desired contour of the article to be molded, the felt or other bands 26 readily adapting themselves to all conceivable contours by reason of their pliable nature.

It will thus be seen from the foregoing description that in a machine constructed in accordance with my improvements, pressures, unattainable in other devices of a similar character, may be applied to the material during molding and further that the friction dependent upon the movement of the chains and belts under heavy pressures is reduced to a minimum.

What I do claim as my invention and desire to secure by Letters Patent is:—

1. In a machine of the class described, the combination of superposed endless traveling chains, pressure beds within said chains respectively, spaced endless guide members within the limits of and on either side of each endless chain, and anti-friction rollers extending through the chains respectively and having their terminals engaged in related guide members and adapted during their rotation to move bodily around the related pressure bed and between the latter and the adjacent portion of the related endless traveling chain.

2. In a machine of the class described, the combination of superposed endless chains each of which is formed of hollow links having their inner sides opened and their inner edges disposed in a common plane respectively, pressure beds within said chains respectively, spaced endless guide members within the limits of each chain, and anti-friction rollers extending through the chains respectively and having their terminals engaged in relative guide members and adapted during their rotation to move bodily around the related pressure bed and to engage the latter and the inner edges of the links when passing between the bed and the adjacent portion of the chain.

3. In a machine of the class described, the combination of superposed endless traveling chains and means for forcing the adjacent portions of said chains into compressive relation, each of said chains comprising a plurality of hollow castings having their inner sides open and flat end portions, the inner terminals of the end portions of adjacent castings extending at an angle away from each other, a plurality of lugs on the inner face of the outer side of each casting, a spindle mounted in said lugs, and links connecting the spindles of adjacent castings, said links extending through openings in the abutting ends of the castings.

In testimony whereof I have signed my name to this specification in the presence of two witnesses.

SAMUEL HAYES.

Witnesses:
 JAN ENGEL VAN GELDER,
 GEORGE HUGHES.